United States Patent
Seo et al.

(10) Patent No.: US 11,458,839 B2
(45) Date of Patent: Oct. 4, 2022

(54) DEVICE AND METHOD FOR PREVENTING DRIVING UNDER INFLUENCE

(71) Applicants: Hyundai Motor Company, Seoul (KR); Kia Motors Corporation, Seoul (KR)

(72) Inventors: Sang Kyung Seo, Seoul (KR); Eung Hwan Kim, Seoul (KR); Gyun Ha Kim, Incheon (KR); Dae Yun An, Anyang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 209 days.

(21) Appl. No.: 17/082,252

(22) Filed: Oct. 28, 2020

(65) Prior Publication Data
US 2022/0024309 A1    Jan. 27, 2022

(30) Foreign Application Priority Data
Jul. 27, 2020    (KR) .......... 10-2020-0093291

(51) Int. Cl.
*B60K 28/06*    (2006.01)
*B60W 40/08*    (2012.01)

(52) U.S. Cl.
CPC .......... *B60K 28/063* (2013.01); *B60W 40/08* (2013.01); *B60W 2040/0836* (2013.01); *B60W 2540/24* (2013.01)

(58) Field of Classification Search
CPC .............. B60K 28/063; B60W 40/08; B60W 2040/8036; B60W 2540/24
See application file for complete search history.

(56) References Cited

U.S. PATENT DOCUMENTS

| | | | |
|---|---|---|---|
| 2010/0043524 A1* | 2/2010 | Takata | G01N 33/4972 73/23.3 |
| 2017/0050519 A1* | 2/2017 | Cristofaro | B60K 28/04 |
| 2017/0096145 A1* | 4/2017 | Bahn | E05F 15/70 |
| 2019/0113502 A1* | 4/2019 | Ruland | G01N 33/4972 |
| 2021/0148892 A1* | 5/2021 | Ruland | B60K 28/063 |

FOREIGN PATENT DOCUMENTS

| | | | | |
|---|---|---|---|---|
| AU | 2004320316 A1 * | 1/2007 | .......... | B60K 28/063 |
| CN | 113978248 A * | 1/2022 | .......... | B60K 28/063 |

* cited by examiner

*Primary Examiner* — Karen Beck
(74) *Attorney, Agent, or Firm* — Morgan, Lewis & Bockius LLP

(57) ABSTRACT

A device and a method for preventing driving under influence, may include a first measuring device configured for detecting alcohol in indoor air of a vehicle, and a processor connected to the first measuring device, wherein the processor performs a first check of checking a presence or an absence of the alcohol in the indoor air through the first measuring device before a driver boards the vehicle, performs a second check of checking the presence or the absence of the alcohol in the indoor air through the first measuring device after the driver boards the vehicle, and determines whether there is a possibility that the driver is drunken based on the results of performing the first check and the second check.

20 Claims, 6 Drawing Sheets

| Primary Quick Check Result | | | | Secondary Quick Check Result | | | | State Switch |
|---|---|---|---|---|---|---|---|---|
| Simplified Alcohol Sensor | Olfactory Sensor | | Expected Scenario | Simplified Alcohol Sensor | Olfactory Sensor | | Expected Scenario | |
| Alcohol Component | Air Freshener Odor | Alcohol Odor | | Alcohol Component | Perfume/Air Freshener Odor | Alcohol Odor | | |
| NOT DETECTED | NOT DETECTED | NOT DETECTED | NO INFLUENCE FACTOR | NOT DETECTED | NOT DETECTED | NOT DETECTED | SAME CONDITION (NO INFLUENCE OF DRUNKEN DRIVER) | START |
| NOT DETECTED | NOT DETECTED | NOT DETECTED | NO INFLUENCE FACTOR | NOT DETECTED | DETECTED | DETECTED | DRIVER PERFUME | START |
| NOT DETECTED | NOT DETECTED | NOT DETECTED | NO INFLUENCE FACTOR | NOT DETECTED | NOT DETECTED | DETECTED | DRIVER PERFUME | START |
| NOT DETECTED | NOT DETECTED | NOT DETECTED | NO INFLUENCE FACTOR | DETECTED | DETECTED | DETECTED | DRIVER PERFUME | START |
| NOT DETECTED | NOT DETECTED | NOT DETECTED | NO INFLUENCE FACTOR | DETECTED | NOT DETECTED | DETECTED | UNCLEAR | RE-QUICK CHECK |
| NOT DETECTED | NOT DETECTED | NOT DETECTED | NO INFLUENCE FACTOR | DETECTED | DETECTED | NOT DETECTED | UNCLEAR | RE-QUICK CHECK |
| NOT DETECTED | DETECTED | NOT DETECTED | AIR FRESHENER IN VEHICLE | NOT DETECTED | NOT DETECTED | NOT DETECTED | AIR FRESHENER ODOR EXTINCTION | START |
| NOT DETECTED | DETECTED | NOT DETECTED | AIR FRESHENER IN VEHICLE | NOT DETECTED | DETECTED | NOT DETECTED | SAME CONDITION (NO INFLUENCE OF DRUNKEN DRIVER) | START |
| NOT DETECTED | DETECTED | NOT DETECTED | AIR FRESHENER IN VEHICLE | NOT DETECTED | NOT DETECTED | DETECTED | AIR FRESHENER ODOR EXTINCTION + DRIVER PERFUME | START |
| NOT DETECTED | DETECTED | NOT DETECTED | AIR FRESHENER IN VEHICLE | DETECTED | DETECTED | DETECTED | DRIVER PERFUME | START |
| NOT DETECTED | DETECTED | NOT DETECTED | AIR FRESHENER IN VEHICLE | DETECTED | NOT DETECTED | DETECTED | UNCLEAR | RE-QUICK CHECK |
| NOT DETECTED | DETECTED | NOT DETECTED | AIR FRESHENER IN VEHICLE | DETECTED | DETECTED | NOT DETECTED | DRIVER USES PERFUME AFTER BOARDING | START |
| NOT DETECTED | DETECTED | DETECTED | AIR FRESHENER IN VEHICLE | NOT DETECTED | NOT DETECTED | NOT DETECTED | UNCLEAR | RE-QUICK CHECK |
| NOT DETECTED | DETECTED | DETECTED | AIR FRESHENER IN VEHICLE | NOT DETECTED | DETECTED | NOT DETECTED | AIR FRESHENER ODOR EXTINCTION | START |
| NOT DETECTED | DETECTED | DETECTED | AIR FRESHENER IN VEHICLE | NOT DETECTED | NOT DETECTED | DETECTED | SAME CONDITION (NO INFLUENCE OF DRUNKEN DRIVER) | START |
| NOT DETECTED | DETECTED | DETECTED | AIR FRESHENER IN VEHICLE | DETECTED | DETECTED | DETECTED | DRIVER PERFUME | START |
| NOT DETECTED | DETECTED | DETECTED | AIR FRESHENER IN VEHICLE | DETECTED | NOT DETECTED | DETECTED | UNCLEAR | RE-QUICK CHECK |
| NOT DETECTED | DETECTED | DETECTED | AIR FRESHENER IN VEHICLE | DETECTED | DETECTED | NOT DETECTED | UNCLEAR | RE-QUICK CHECK |
| DETECTED | NOT DETECTED | DETECTED | ALCOHOL NEGLIGENCE OR AIR FRESHENER NEW PRODUCT | NOT DETECTED | NOT DETECTED | NOT DETECTED | AIR FRESHENER ODOR EXTINCTION + DRIVER PERFUME | START |
| DETECTED | NOT DETECTED | DETECTED | ALCOHOL NEGLIGENCE OR AIR FRESHENER NEW PRODUCT | NOT DETECTED | DETECTED | NOT DETECTED | AIR FRESHENER ODOR EXTINCTION | START |
| DETECTED | DETECTED | NOT DETECTED | AIR FRESHENER NEW PRODUCT IN VEHICLE | DETECTED | DETECTED | DETECTED | SAME CONDITION (NO INFLUENCE OF DRUNKEN DRIVER) | START |
| DETECTED | DETECTED | NOT DETECTED | AIR FRESHENER NEW PRODUCT IN VEHICLE | NOT DETECTED | NOT DETECTED | DETECTED | UNCLEAR | RE-QUICK CHECK |
| DETECTED | DETECTED | NOT DETECTED | AIR FRESHENER NEW PRODUCT IN VEHICLE | NOT DETECTED | DETECTED | DETECTED | UNCLEAR | RE-QUICK CHECK |
| DETECTED | DETECTED | NOT DETECTED | AIR FRESHENER NEW PRODUCT IN VEHICLE | NOT DETECTED | NOT DETECTED | NOT DETECTED | UNCLEAR | RE-QUICK CHECK |
| DETECTED | DETECTED | DETECTED | AIR FRESHENER NEW PRODUCT + ALCOHOL NEGLIGENCE | DETECTED | DETECTED | DETECTED | SAME CONDITION (NO INFLUENCE OF DRUNKEN DRIVER) | START |
| DETECTED | DETECTED | DETECTED | AIR FRESHENER NEW PRODUCT + ALCOHOL NEGLIGENCE | DETECTED | DETECTED | DETECTED | UNCLEAR | RE-QUICK CHECK |

Fig. 3

DEVICE AND METHOD FOR PREVENTING DRIVING UNDER INFLUENCE

CROSS-REFERENCE TO RELATED APPLICATION

The present application claims priority to Korean Patent Application No. 10-2020-0093291, filed on Jul. 27, 2020, the entire contents of which is incorporated herein for all purposes by this reference.

BACKGROUND OF THE INVENTION

Field of the Invention

The present invention relates to a device and a method for preventing driving under influence.

Description of Related Art

As seriousness of traffic accidents resulted from driving under influence has emerged, regulations on the driving under influence are strengthening. Furthermore, it is mandatory to install a driving under influence preventing device (an alcohol ignition interlock device) on a vehicle to prevent the driving under influence. The driving under influence preventing device measures an alcohol concentration in exhalation of a driver using an alcohol sensor before starting the vehicle, and controls the start of the vehicle based on the measured alcohol concentration, restricting vehicle driving of a drunk driver.

However, the driving under influence preventing device has an inconvenience in that even a sober driver who didn't drink the alcohol may perform the alcohol concentration measurement. Furthermore, it may be difficult for the driving under influence preventing device to measure a blood alcohol level of the driver by a fine alcohol component contained in a perfume, an air freshener, and/or a hand sanitizer.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a device and a method for preventing driving under influence that detect alcohol in indoor air of a vehicle in advance to perform a blood alcohol level measurement of a driver only when it is suspected that the driver is drunken.

The technical problems to be solved by the present inventive concept are not limited to the aforementioned problems, and any other technical problems not mentioned herein will be clearly understood from the following description by those skilled in the art to which various exemplary embodiments of the present invention pertains.

According to various aspects of the present invention, a device configured for preventing driving under influence includes a first measuring device configured for detecting alcohol in indoor air of a vehicle, and a processor connected to the first measuring device, wherein the processor performs a first check of checking a presence or an absence of the alcohol in the indoor air through the first measuring device before a driver boards the vehicle, performs a second check of checking the presence or the absence of the alcohol in the indoor air through the first measuring device after the driver boards the vehicle, and determines whether there is a possibility that the driver is drunken based on the results of performing the first check and the second check.

In one implementation, the first measuring device may include a simplified alcohol sensor for detecting an alcohol component in the indoor air, and an olfactory sensor for detecting an alcohol odor in the indoor air.

In one implementation, the processor may determine whether there is the possibility that the driver is drunken based on whether the alcohol component and the alcohol odor are detected in the first check and the second check.

In one implementation, the processor may wait for a predetermined time period and then re-perform the second check when there is the possibility that the driver is drunken.

In one implementation, the predetermined time period may be defined as a time required for the alcohol to evaporate and disappear.

In one implementation, the device may further include a second measuring device connected to the processor and configured for measuring an alcohol level of the driver, wherein the processor may measure a blood alcohol concentration from breath of the driver using the second measuring device when there is the possibility that the driver is drunken.

In one implementation, the processor may restrict start of the vehicle when the blood alcohol concentration is equal to or above a threshold value, and allow the start of the vehicle when the blood alcohol concentration is below the threshold value.

In one implementation, the processor may allow start of the vehicle when there is no possibility that the driver is drunken.

In one implementation, the first measuring device may be formed as a single module with the second measuring device.

In one implementation, the processor may output a guide message indicating that the second check is being performed on an output device connected to the processor.

According to various aspects of the present invention, a method for preventing driving under influence includes performing a first check of checking a presence or an absence of alcohol in indoor air of a vehicle before a driver boards the vehicle, performing a second check of checking the presence or the absence of the alcohol in the indoor air after the driver boards the vehicle, and determining whether there is a possibility that the driver is drunken based on the results of performing the first check and the second check.

In one implementation, the performing of the first check may include detecting that a driver's seat door of the vehicle is unlocked, and detecting an alcohol component and an alcohol odor in the indoor air using a simplified alcohol sensor and an olfactory sensor disposed in the vehicle.

In one implementation, the performing of the second check may include detecting that a status of a driver's seat door of the vehicle is switched from an opened status to a closed status, receiving a command instructing start of the vehicle, and detecting an alcohol component and an alcohol odor in the indoor air using a simplified alcohol sensor and an olfactory sensor disposed in the vehicle.

In one implementation, the method may further include measuring a blood alcohol concentration from breath of the driver using a blood alcohol level measuring sensor.

In one implementation, the method may further include determining that the start of the vehicle is not available when the measured blood alcohol concentration is equal to or above a predetermined threshold value.

In one implementation, the method may further include allowing the start of the vehicle when the measured blood alcohol concentration is below a predetermined threshold value.

In one implementation, the method may further include allowing the start of the vehicle when there is not possibility that the driver is drunken.

In one implementation, the method may further include waiting for a predetermined time period and then re-performing the second check when there is the possibility that the driver is drunken.

In one implementation, the predetermined time period may be defined as a time required for the alcohol to evaporate and disappear.

In one implementation, the performing of the second check may further include outputting a guide message indicating that the presence or the absence of the alcohol in the indoor air is being verified on an output device connected to the processor.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 3 illustrates an example of a lookup table referred to when determining to re-perform a secondary quick check according to various exemplary embodiments of the present invention;

Figure 1:
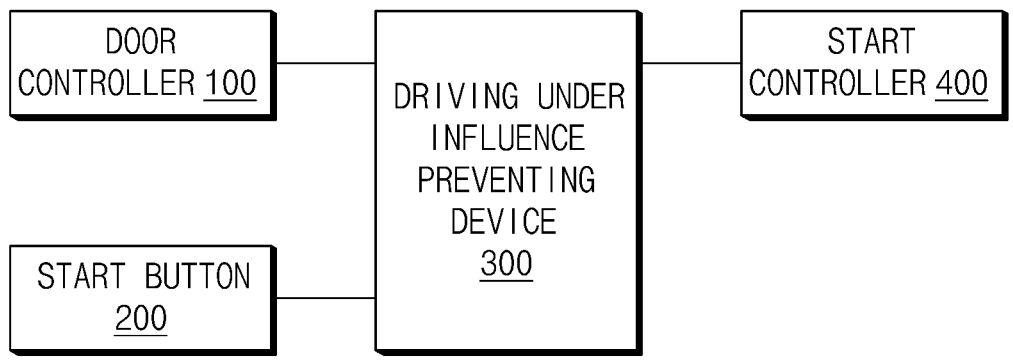
FIG. 1 is a block diagram illustrating a vehicle system for preventing driving under influence according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the exemplary drawings. In adding the reference numerals to the components of each drawing, it may be noted that the identical or equivalent component is designated by the identical numeral even when they are displayed on other drawings. Furthermore, in describing the exemplary embodiment of the present invention, a detailed description of the related known configuration or function will be omitted when it is determined that it interferes with the understanding of the exemplary embodiment of the present invention.

In describing the components of the exemplary embodiment according to various exemplary embodiments of the present invention, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which the present disclosure belongs. It will be further understood that terms, such as those defined in commonly used dictionaries, may be interpreted as having a meaning which is consistent with their meaning in the context of the relevant art and will not be interpreted in an idealized or overly formal sense unless so defined herein.

FIG. 1 is a block diagram illustrating a vehicle system for preventing driving under influence according to various exemplary embodiments of the present invention.

Referring to FIG. 1, a vehicle system may include a door controller 100, a start button 200, a driving under influence preventing device 300, and a start controller 400. The door controller 100, the driving under influence preventing device 300, and the start controller 400 may be implemented as an electric control unit (ECU), software and/or a program.

The door controller 100 may control a vehicle door (e.g., a driver's seat door, a passenger's seat door, and/or a back seat door) in a response to an instruction of a top-level controller (e.g., a vehicle control unit (VCU) and the like). For example, when receiving a door lock command from a user terminal (e.g., a smartphone, a smart key, or the like), the top-level controller may instruct the door controller 100 to switch a status of the vehicle door to a locked status. The door controller 100 may switch the status of the vehicle door to the locked status in a response to the instruction of the top-level controller.

Furthermore, the door controller 100 may monitor the status of each vehicle door using door sensors disposed on the vehicle. The door sensor may detect the status of the vehicle door and transmit a door lock signal, a door unlock signal, a door open signal, or a door close signal to the door controller 100 and/or the driving under influence preventing device 300 based on the detected door status. Furthermore, the door controller 100 may transmit information (e.g., door status information) on the status of the vehicle door identified through the door sensors to the driving under influence preventing device 300. The door status information may include a locked status, an unlocked status, an opened status, or a closed status of the door.

The start button 200 may be disposed around the driver's seat. The start button 200, which is an input device manipulated by a user (e.g., a driver), may transmit a start signal or a stop signal to a power control device in a response to the user manipulation. Furthermore, the start button 200 may transmit the start signal or the stop signal to the driving under influence preventing device 300.

The driving under influence preventing device 300 may detect alcohol in indoor air of the vehicle before and after the driver boards the vehicle to determine whether there is a possibility that the driver is drunken. The driving under influence preventing device 300 may determine to perform a blood alcohol level measurement of the driver when there is the possibility that the driver is drunken. In other words, the driving under influence preventing device 300 may determine to perform the blood alcohol level measurement of the driver when it is suspected that the driver is drunken (when whether the driver is drunken is unclear). The driving under influence preventing device 300 may determine not to perform the blood alcohol level measurement of the driver when there is no possibility that the driver is drunken. In other words, the driving under influence preventing device 300 may determine not to perform the blood alcohol level measurement of the driver when it is certain that the driver is not drunken.

The driving under influence preventing device 300 may measure a level of alcohol contained in breath (exhalation) of the driver when there is the possibility that the driver is drunken. The driving under influence preventing device 300 may determine whether to start the vehicle based on the measured alcohol level.

The start controller 400 may restrict the start of the vehicle or start the vehicle based on the determination, by the driving under influence preventing device 300, of whether to start the vehicle. When starting the vehicle, the start controller 400 may transmit the start signal to an engine management system (EMS) and/or a motor control unit (MCU).

Figure 2:
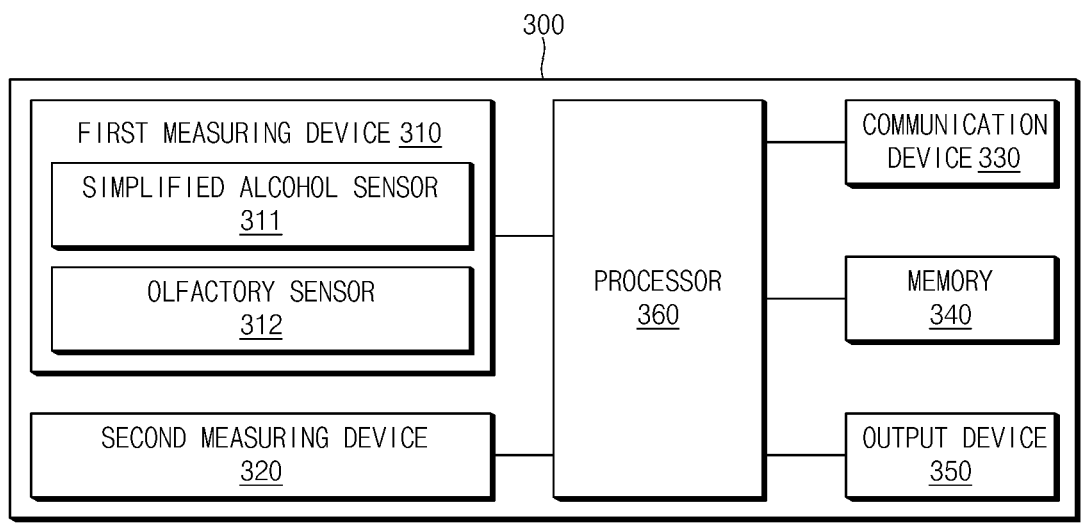
FIG. 2 illustrates a block diagram of a driving under influence preventing device according to various exemplary embodiments of the present invention.

FIG. 2 illustrates a block diagram of a driving under influence preventing device according to various exemplary embodiments of the present invention. FIG. 3 illustrates an example of a lookup table referred to when determining to re-perform a secondary quick check according to various exemplary embodiments of the present invention.

Referring to FIG. 2, the driving under influence preventing device 300 may include a first measuring device 310, a second measuring device 320, a communication device 330, a memory 340, an output device 350, and a processor 360.

The first measuring device 310 may be disposed in the vehicle to detect the alcohol present in the indoor air. The first measuring device 310 may include a simplified alcohol sensor 311 that detects a presence or an absence of an alcohol component in the indoor air of the vehicle. The simplified alcohol sensor 311 is for detecting only a presence or an absence of the alcohol component in the driver's seat, but requires a level of detection performance configured for detecting a presence or an absence of a trace amount of alcohol component. The simplified alcohol sensor 311 may be implemented as a low-performance and low-cost sensor compared to a blood alcohol level measuring sensor applied to the second measuring device 320.

The first measuring device 310 may include an olfactory sensor 312 that detects odor molecules in the indoor air of the vehicle. The olfactory sensor 312 may detect a perfume odor, an air freshener odor, and/or an alcohol odor. As the olfactory sensor 312, at least one of a metal oxide semiconductor (MOS) sensor, a polymer sensor, a photoacoustic spectroscopy sensor, a surface plasmon resonance sensor, and a micro cantilever sensor may be used. The olfactory sensor 312 may be implemented as a separate board from the simplified alcohol sensor 311.

The second measuring device 320 may measure the level of the alcohol (e.g., the concentration of the alcohol) contained in the breath (the exhalation) of the driver. The second measuring device 320 may include the blood alcohol level measuring sensor having a performance configured for precisely detecting the alcohol with a resolution of 0.01% blood alcohol concentration. In the present connection, the resolution of 0.01% blood alcohol concentration may be converted to a resolution of 0.05 mg alcohol concentration in 1 liter of air. As the blood alcohol level measuring sensor, a fuel cell sensor, a semiconductor sensor, and/or a spectrophotometer sensor may be used. The second measuring device 320 may be manufactured on-board with the first measuring device 310.

The communication device 330 may include a communication circuit supporting communication with the door controller 100 and the start controller 400. The communication circuit may use communication technologies such as a controller area network (CAN), a media oriented system transport (MOST) network, a local interconnect network (LIN), an ethernet, and/or an X-by-Wire (Flexray).

The memory 340 may store instructions executed by the processor 360. The memory 340 may store various setting information and software and/or programs that perform predetermined specific functions. The memory 340 may also store data generated based on an operation of the processor 360. The memory 340 may store a lookup table (e.g., a table shown in FIG. 3). The memory 340 may be implemented as at least one of non-transitory storage media such as a flash memory, a hard disk, a secure digital card (SD card), a random access memory (RAM), a static random access memory (SRAM), a read only memory (ROM), a programmable read only memory (PROM), an electrically erasable and programmable ROM (EEPROM), an erasable and programmable ROM (EPROM), a register, and the like.

The output device 350 may output information in a response to an instruction of the processor 360. The output device 350 may include at least one of a liquid crystal display (LCD), a thin film transistor-liquid crystal display (TFT-LCD), an organic light-emitting diode (OLED) display, a flexible display, a three-dimensional display (3D display), a transparent display, a head-up display (HUD), a touch screen, and a cluster. The output device 350 may also include a sound output module such as a speaker configured for outputting audio data. The output device 350 may be implemented as a touch screen coupled with a touch sensor, and thus may be used as the input device. As the touch sensor, a touch film, a touch pad, or the like may be used.

The processor 360 may include at least one of an application specific integrated circuit (ASIC), a digital signal processor (DSP), a programmable logic device (PLD), a field programmable gate array (FPGA), a central processing unit (CPU), a microcontroller, and a microprocessor. The processor 360 may perform an operation or data processing associated with control and/or communication of one or more other components of the driving under influence preventing device 300.

The processor 360 may perform a primary quick check and a secondary quick check for pre-detecting the alcohol contained in the indoor air of the vehicle using the first measuring device 310 before and after the driver boards the vehicle. The primary quick check and the secondary quick check may detect the alcohol in the indoor air of the vehicle using the simplified alcohol sensor 311 and the olfactory sensor 312.

When the driver's seat door of the vehicle is unlocked, the processor 360 performs the primary quick check before the driver boards the vehicle. The processor 360 may detect that a status of the driver's seat door is switched from the locked status to the unlocked status through the door controller 100. The processor 360 may detect the presence or the absence of the alcohol component in the indoor air of the vehicle through the simplified alcohol sensor 311. The processor 360 may detect the alcohol odor in the indoor air of the vehicle through the olfactory sensor 312.

The processor 360 may perform the secondary quick check when the driver's seat door is opened and then closed. In the present connection, the processor 360 may additionally determine whether the driver is accommodated in the driver's seat using a sensor (e.g., a weight sensor and the like) disposed on the driver's seat. Detecting that the status of the driver's seat door is switched from the opened status to the closed status, the processor 360 waits until there is an input of the start button 200. When the start button 200 is turned on, the processor 360 may detect the alcohol component and the alcohol odor in the indoor air of the vehicle through the simplified alcohol sensor 311 and the olfactory sensor 312. While the primary quick check and the secondary quick check are in progress, the processor 360 may output a message informing that the quick check is in progress on the output device 350.

The processor 360 may determine the possibility that the driver is drunken based on a result of performing the primary quick check and the secondary quick check. The processor 360 may determine that there is no possibility that the driver is drunken when it is certain that the driver is not drunken. The processor 360 may determine that there is the possibility that the driver is drunken when it is not certain that the driver is not drunken (when whether the driver is drunken is unclear).

The processor 360 may allow the start of the vehicle when there is no possibility that the driver is drunken. For example, when the alcohol component and the alcohol odor are not detected in the primary quick check, but the alcohol component is detected and the alcohol odor is not detected in the secondary quick check, the processor 360 may determine that there is no possibility that the driver is drunken with reference to the table shown in FIG. 3 to allow the start of the vehicle.

When there is the possibility that the driver is drunken, the processor 360 may determine to perform a precise blood alcohol level measurement of the driver using the second measuring device 320. In other words, when it is suspected that the driver is drunken, the processor 360 may determine to perform the precise blood alcohol level measurement of the driver.

According to another exemplary embodiment of the present invention, when there is the possibility that the driver is drunken, the processor 360 may wait for a predetermined time period (e.g., 5 seconds) and then re-perform the secondary quick check. The number of times to re-perform the secondary quick check may be set in advance. The processor 360 may determine the possibility that the driver is drunken based on a result of the re-performed secondary quick check, and determine whether to perform the precise blood alcohol level measurement of the driver based on the determination result.

When it is determined to perform the precise blood alcohol level measurement, the processor 360 may measure the blood alcohol concentration of the driver using the second measuring device 320. The processor 360 may output information guiding a precise blood alcohol level measurement procedure on the output device 350.

When the measured blood alcohol concentration is equal to or above a threshold value previously stored in the memory 340, the processor 360 may restrict the start of the vehicle. The processor 360 may output a warning message informing that the start of the vehicle is not available on the output device 350. The processor 360 may inform that the vehicle start is restricted because of the driver's drinking, and at the same time suggest another method of movement such as calling a substitute driver, calling a taxi, or the like. The processor 360 may allow the start of the vehicle when the measured blood alcohol concentration is below the threshold value. The processor 360 may transmit information on whether to restrict the start of the vehicle to the start controller 400.

According to the above embodiment, the precise blood alcohol level measurement may be avoided when a driver who didn't drink the alcohol utilizes a perfume, an air freshener and/or a hand sanitizer including the alcohol component.

Figure 4:
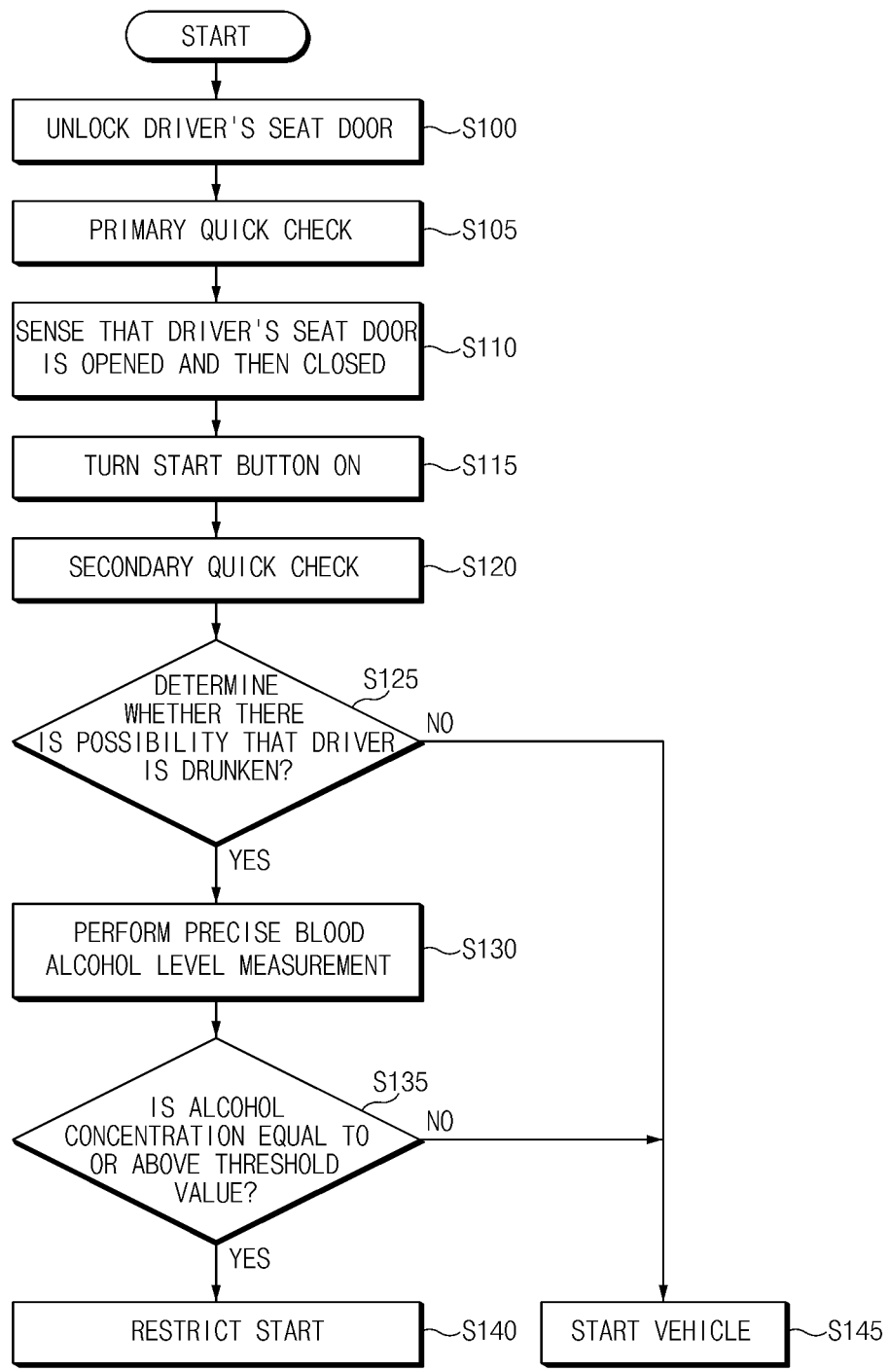
FIG. 4 is a flowchart illustrating a method for preventing driving under influence according to various exemplary embodiments of the present invention.

FIG. 4 is a flowchart illustrating a method for preventing driving under influence according to various exemplary embodiments of the present invention.

Referring to FIG. 4, the processor 360 may detect the unlocking of the driver's seat door (S100). The processor 360 may detect that the status of the driver's seat door is switched from the locked status to the unlocked status through the door controller 100 or the sensor.

When the driver's seat door is unlocked, the processor 360 performs the primary quick check before the driver boards the vehicle (S105). The processor 360 may detect the alcohol contained in the indoor air of the vehicle through a primary quick check procedure (state). The processor 360 may determine whether the alcohol component is present in the air using the simplified alcohol sensor 311. The processor 360 may determine whether alcohol odor molecules are present in the air using the olfactory sensor 312. The processor 360 may identify in advance that there is a product (e.g., the air freshener and the like) including the alcohol component in the vehicle by referring to the lookup table stored in the memory 340 based on the primary quick check result.

The processor 360 may detect that the driver's seat door is opened and then closed (S110). The processor 360 may identify that the status of the driver's seat door is switched from the opened status to the closed status through the door controller 100 or the sensor. The processor 360 detects that the status of the driver's seat door is switched from the opened status to the closed status, identifying that the driver has boarded the vehicle. In the present connection, the processor 360 may additionally use the weight sensor disposed on the driver's seat, an image sensor disposed in front of the driver's seat, and the like to determine whether the driver has boarded the vehicle.

The processor 360 may identify that the start button 200 is turned on (S115). The start button 200 may transmit the start signal (e.g., an ON signal) or the stop signal (e.g., an OFF signal) to the processor 360 in a response to the input of the user (e.g., the driver).

When identifying that the start button 200 is turned on, the processor 360 performs the secondary quick check (S120). The processor 360 may detect the alcohol component and the alcohol odor in the indoor air of the vehicle using the simplified alcohol sensor 311 and the olfactory sensor 312. The processor 360 waits while the start button 200 is maintained in an off status.

The processor 360 may determine whether there is the possibility that the driver is drunken based on the primary quick check result and the secondary quick check result (S125). When determining whether there is the possibility that the driver is drunken, the processor 360 may refer to the lookup table stored in the memory 340. Regardless of the result of the primary quick check, when the alcohol component and the alcohol odor are not detected in the secondary quick check, the processor 360 may determine that the driver didn't drink the alcohol, and thus determine not to perform the precise blood alcohol level measurement. Regardless of the result of the primary quick check, when the alcohol component and the alcohol odor are detected in the secondary quick check, the processor 360 may determine that the driver is suspected to be drunken (or that whether the driver is drunken is unclear) to determine to perform the precise blood alcohol level measurement. Furthermore, when the alcohol component is not detected in the primary quick check, but the alcohol component is detected in the secondary quick check, the processor 360 may determine that the driver is suspected to be drunken or that whether the driver is drunken is unclear to determine to perform the precise blood alcohol level measurement.

The processor 360 may be implemented to re-perform the secondary quick check when whether the driver is drunken is unclear. For example, when the alcohol component and the alcohol odor are not detected in the primary quick check, but the alcohol component and the alcohol odor are detected in the secondary quick check, the processor 360 may wait for a time (e.g., 5 seconds) until the alcohol component and alcohol odor are volatilized to remove an effect of use of the product (e.g., the perfume and/or the hand cleaner) including the alcohol component of the driver, and then go back to S120 to re-perform the secondary quick check.

When it is determined in S125 that there is the possibility that the driver is drunken, the processor 360 performs the precise blood alcohol level measurement (S130). The processor 360 may measure the concentration of the alcohol contained in the breath (the exhalation) of the driver using the blood alcohol level measuring sensor.

The processor 360 determines whether the alcohol concentration measured by the precise blood alcohol level measurement is equal to or above the threshold value (S135). In the present connection, the threshold value, which is a criterion for determining whether to allow (permit) the vehicle start, may be set by a system designer in advance based on laws and regulations.

The processor 360 may restrict the start of the vehicle when the alcohol concentration is equal to or above the threshold value (S140). The processor 360 may transmit data (information) informing that the start is not available to the start controller 400. Furthermore, the processor 360 may output the message informing that the start is not available to the output device 350.

When the alcohol concentration is below the threshold value, the processor 360 may start the vehicle (S145). The processor 360 may transmit information informing that the start is permitted to the start controller 400. The start controller 400 may drive a power generating device when receiving the start permission from the processor 360.

Figure 5A:
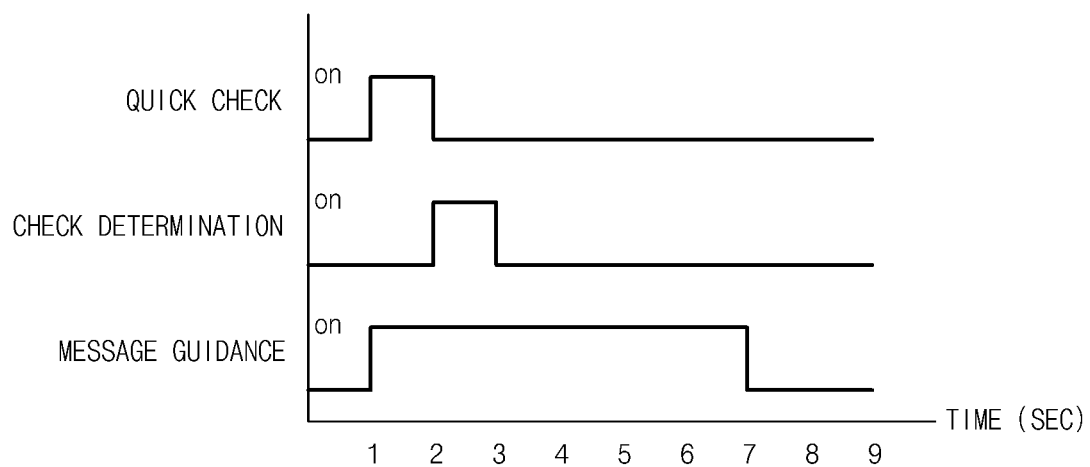
FIG. 5A and FIG. 5B illustrate a timing diagram of an operation of a processor based on whether to re-perform a quick check according to various exemplary embodiments of the present invention.
Figure 5B:
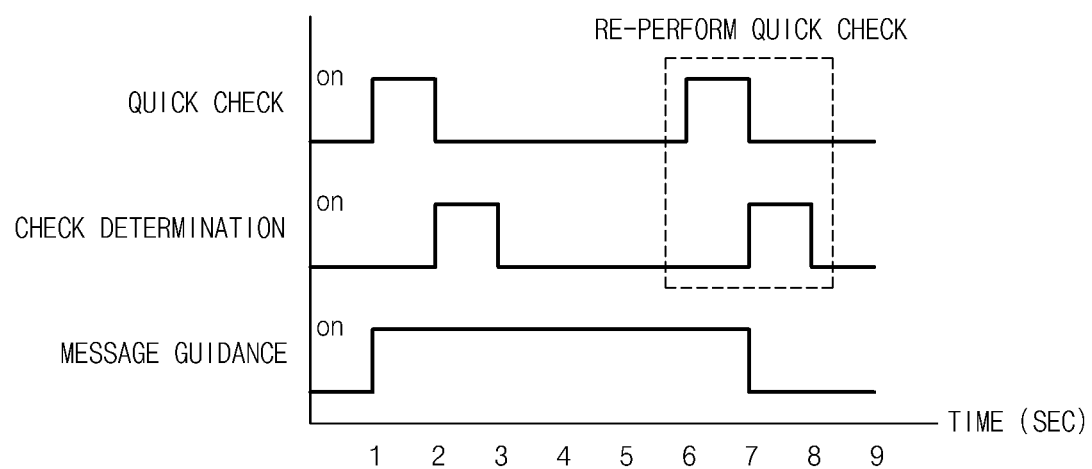

FIGS. 5A and 5B illustrate a timing diagram of an operation of a processor based on whether to re-perform a quick check according to various exemplary embodiments of the present invention.

When the secondary quick check is initiated, the processor 360 may detect the alcohol component and/or the alcohol odor for a predetermined time period (e.g., 1 second) through the first measuring device 310. The processor 360 may output a guide message such as "in vehicle air analysis" on the output device 350. In the present connection, the processor 360 may output the guide message for the predetermined time period (e.g., 5 seconds). The processor 360 may stop outputting the guide message when it is necessary to output a priority message.

When the secondary quick check result is output while the guide message is being output, the processor 360 may permit or restrict the start of the vehicle based on the output result. Referring to FIG. 5A, when the start of the vehicle is permitted, the processor 360 may not re-perform the secondary quick check. Referring to FIG. 5B, when the start of the vehicle is restricted, the processor 360 may re-perform the secondary quick check within the time (e.g., 5 seconds) of outputting the guide message.

The description above is merely illustrative of the technical idea of the present invention, and various modifications and changes may be made by those skilled in the art without departing from the essential characteristics of the present invention. Therefore, the exemplary embodiments included in various exemplary embodiments of the present invention are not intended to limit the technical idea of the present invention but to illustrate the present invention, and the scope of the technical idea of the present invention is not limited by the embodiments. The scope of the present invention may be construed as being covered by the scope of the appended claims, and all technical ideas falling within the scope of the claims may be construed as being included in the scope of the present invention.

According to various exemplary embodiments of the present invention, because the alcohol in the indoor air of the vehicle is detected in advance and the blood alcohol level measurement of the driver is performed only when it is suspected that the driver is drunken based on the detection result, ameliorating inconvenience that a sober driver has to perform the blood alcohol level measurement.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A device for preventing driving under influence, the device including:

a first measuring device configured for detecting alcohol in indoor air of a vehicle; and a processor connected to the first measuring device, wherein the processor is configured to:

perform a first check of checking a presence or an absence of the alcohol in the indoor air through the first measuring device before a driver boards the vehicle;

perform a second check of checking the presence or the absence of the alcohol in the indoor air through the first measuring device after the driver boards the vehicle; and determine whether there is a possibility that the driver is drunken according to results of performing the first check and the second check.

2. The device of claim 1, wherein the first measuring device includes:

a simplified alcohol sensor of detecting an alcohol component in the indoor air; and an olfactory sensor of detecting an alcohol odor in the indoor air.

3. The device of claim 2, wherein the processor is configured to determine whether there is the possibility that the driver is drunken according to whether the alcohol component and the alcohol odor are detected in the first check and the second check.

4. The device of claim 3, wherein the processor is configured to wait for a predetermined time period and then re-perform the second check upon determining that there is the possibility that the driver is drunken.

5. The device of claim 4, wherein the predetermined time period is defined as a time required for the alcohol to evaporate and disappear.

6. The device of claim 3, further including:

a second measuring device connected to the processor and configured for measuring an alcohol level of the driver, wherein the processor is configured to measure a blood alcohol concentration from breath of the driver using the second measuring device upon determining that there is the possibility that the driver is drunken.

7. The device of claim 6, wherein the processor is configured to:

restrict start of the vehicle upon determining that the blood alcohol concentration is equal to or above a threshold value; and allow the start of the vehicle upon determining that the blood alcohol concentration is below the threshold value.

8. The device of claim 3, wherein the processor is configured to allow start of the vehicle upon determining that there is no possibility that the driver is drunken.

9. The device of claim 6, wherein the first measuring device is formed as a single module with the second measuring device.

10. The device of claim 1, wherein the processor is configured to output a guide message indicating that the second check is being performed on an output device connected to the processor.

11. A method of preventing driving under influence, the method comprising:

performing, by a processor, a first check of checking a presence or an absence of alcohol in indoor air of a vehicle before a driver boards the vehicle;

performing, by the processor, a second check of checking the presence or the absence of the alcohol in the indoor air after the driver boards the vehicle;

determining, by the processor, whether there is a possibility that the driver is drunken according to results of performing the first check and the second check;

performing, by the processor, a blood alcohol level measurement of the driver upon determining that there is the possibility that the driver is drunken; and restricting, by the processor, start of the vehicle according to a result of the blood alcohol level measurement.

12. The method of claim 11, wherein the performing of the first check includes:

detecting that a driver's seat door of the vehicle is unlocked; and detecting an alcohol component and an alcohol odor in the indoor air using a simplified alcohol sensor and an olfactory sensor disposed in the vehicle.

13. The method of claim 11, wherein the performing of the second check includes:

detecting that a status of a driver's seat door of the vehicle is switched from an opened status to a closed status;

receiving a command instructing start of the vehicle; and detecting an alcohol component and an alcohol odor in the indoor air using a simplified alcohol sensor and an olfactory sensor disposed in the vehicle.

14. The method of claim 11, further including:

measuring, by the processor, a blood alcohol concentration from breath of the driver using a blood alcohol level measuring sensor upon determining that there is the possibility that the driver is drunken.

15. The method of claim 14, further including:

concluding, by the processor, that the start of the vehicle is not available upon determining that the measured blood alcohol concentration is equal to or above a predetermined threshold value.

16. The method of claim 14, further including:

allowing, by the processor, the start of the vehicle upon determining that the measured blood alcohol concentration is below a predetermined threshold value.

17. The method of claim 11, further including:

allowing, by the processor, the start of the vehicle upon determining that there is not possibility that the driver is drunken.

18. The method of claim 11, further including:

waiting, by the processor, for a predetermined time period and then re-performing the second check upon determining that there is the possibility that the driver is drunken.

19. The method of claim 18, wherein the predetermined time period is defined as a time required for the alcohol to evaporate and disappear.

20. The method of claim 11, wherein the performing of the second check further includes outputting, by the processor, a guide message indicating that the presence or the absence of the alcohol in the indoor air is being checked on an output device connected to the processor.

* * * * *